(12) United States Patent  
Pillay

(10) Patent No.: US 9,400,329 B2  
(45) Date of Patent: Jul. 26, 2016

(54) SYSTEM FOR MAPPING AND TRACKING GROUND TARGETS

(71) Applicant: Venkateshwara Pillay, Selangor Darul Ehsan (MY)

(72) Inventor: Venkateshwara Pillay, Selangor Darul Ehsan (MY)

(*) Notice: Subject to any disclaimer, the term of this patent is extended or adjusted under 35 U.S.C. 154(b) by 209 days.

(21) Appl. No.: 14/256,683

(22) Filed: Apr. 18, 2014

(65) Prior Publication Data

US 2015/0204974 A1 Jul. 23, 2015

(30) Foreign Application Priority Data

Jan. 20, 2014 (MY) .......................... PI 2014000166

(51) Int. Cl.
| | |
|---|---|
| *G01S 13/90* | (2006.01) |
| *G01S 17/02* | (2006.01) |
| *G01S 17/89* | (2006.01) |
| *G01S 7/00* | (2006.01) |
| *G01S 13/86* | (2006.01) |
| *G01S 7/04* | (2006.01) |
| *G01S 7/51* | (2006.01) |

(52) U.S. Cl.
CPC ............... *G01S 13/90* (2013.01); *G01S 7/003* (2013.01); *G01S 13/86* (2013.01); *G01S 13/865* (2013.01); *G01S 17/023* (2013.01); *G01S 17/89* (2013.01); *G01S 7/04* (2013.01); *G01S 7/51* (2013.01)

(58) Field of Classification Search
CPC .................................. H04B 7/14; G01S 13/90
USPC .............................................. 342/25 R, 25 A
See application file for complete search history.

(56) References Cited

U.S. PATENT DOCUMENTS

| | | | | |
|---|---|---|---|---|
| 2005/0004723 | A1* | 1/2005 | Duggan | G05D 1/0061 701/24 |
| 2010/0269143 | A1 | 10/2010 | Rabowsky | |
| 2012/0210853 | A1* | 8/2012 | Abershitz | B64F 1/04 89/1.11 |
| 2012/0319892 | A1* | 12/2012 | Calabrese | G01S 13/9023 342/25 C |
| 2014/0195150 | A1* | 7/2014 | Rios | B64C 39/024 701/469 |
| 2014/0277842 | A1* | 9/2014 | Tofte | B64C 39/024 701/2 |
| 2015/0276917 | A1* | 10/2015 | Dawber | G01S 7/003 342/25 A |

FOREIGN PATENT DOCUMENTS

EP 1318414 A2 6/2003

* cited by examiner

*Primary Examiner* — Peter Bythrow  
*Assistant Examiner* — Helena Seraydaryan  
(74) *Attorney, Agent, or Firm* — Rothwell, Figg, Ernst & Manbeck, P.C.

(57) ABSTRACT

A system for autonomously mapping and tracking of ground targets at a location of interest has been disclosed. The system comprises at least one user control center in operative communication with one or more data relay satellites in Geostationary Equatorial Orbit (GEO), the data relay satellites in operative communication with one or more UAVs and/or SAR satellites with on-board different imaging sensors to obtain various types of imagery data from the ground targets. The data relay satellites target specific constant communication with the user control center and the UAVs and SAR satellites for continuous feedback and control. Moreover, the system process all raw data obtained from the UAVs and SAR satellites to produce 2D and 3D Digital Elevation Models (DEMs) and high resolution images, which are displayed on the user control center and/or selected mobile handheld devices.

19 Claims, 3 Drawing Sheets

SYSTEM FOR MAPPING AND TRACKING GROUND TARGETS

CROSS REFERENCE TO RELATED APPLICATION(S)

This application claims priority to Malaysian Patent Application No. PI 2014000166, filed Jan. 20, 2014, the disclosure of which is incorporated herein in its entirety by reference.

FIELD OF THE INVENTION

The present invention relates to the field of aerial and space monitoring. Particularly, this invention relates to a control system which can autonomously map and/or track ground targets at any location of interest using unmanned aerospace assets.

BACKGROUND OF THE INVENTION

Today, mapping or tracking ground targets at any location of interest from any remote or distant location is particularly useful for resource mapping, pipeline monitoring, intelligence gathering or supporting disaster response teams. In manned airborne surveillance for resource mapping or ground target identification, the resource mapping activities or search and rescue activities can be costly and restrictive due to limited availability of human pilots that cater to these activities. There are some surveillance systems for resource mapping or ground target identification which can be found which involve unmanned aerial assets.

United States Patent Application 20100269143 discloses a system and method for electronic delivery of command, control information to many land and aerial devices, simultaneously or individually, and transmission of video, audio, location, and other information from devices to user defined entities such as network management centers, and devices over defined geographic areas utilizing inter-connected communications satellites.

European Patent Application EP1318414 describes an Aircraft or spacecraft-borne tomofgraphic synthetic aperture radar method for three-dimensional object image, in which, through coherent combination of a large number of Synthetic-Aperture Radar (SAR) sensor recordings from different viewing directions, a true three-dimensional image of buildings, urban areas and mountainous areas is obtained and the backscatter contribution of volume objectives the amount to be separated and independently analyzed according to the invention the realization of different visual directions by a set of independently operating and simultaneously operated SAR antenna is achieved.

Aircraft or UAVs used for resource mapping are often controlled individually by ground operators, whereby the operators have to be available to continuously command and control the UAVs. Also, UAVs or satellites used for resource mapping or ground target identification are often operated independently by various ground stations around the world, making it challenging to correlate the imagery data after it has been processed. It is currently difficult to obtain various types of imagery data for a particular location at the same time-stamp. Further, during operations, satellites currently depend on ground stations within its communication antenna's line of sight to receive tasking commands or perform data downlink operations. If a ground station is over-tasked or not within line of sight, the data is stored on-board until a suitable connection with a ground station can be established. As a result, there are often delays in receiving raw imagery data at a remote ground station, followed by additional delays involved in transferring the data from the remote ground station to the mission control centre for data processing. UAVs need to be constantly in communication range with a ground station or terminal during operations, which means that its operational flight path is restricted by the ground station location.

Thus, there has been a need for a ground target mapping and tracking system which can autonomously perform mapping and tracking operation at any location around the world without being restricted by remote ground terminals or stations and able to generate or process image data products obtained from the ground target locations and display them to users at the ground stations in near real-time.

SUMMARY OF THE INVENTION

The following presents a simplified summary of the invention in order to provide a basic understanding of some aspects of the invention. This summary is not intended as an extensive overview of the invention. It is not intended to identify key/critical elements of the invention. Its sole purpose is to present some concepts of the invention in a simplified form as a prelude to the more detailed description that is presented later.

Example applications of the invention include any form of mapping or reconnaissance activity which requires aerial or space technology. These applications include pipeline monitoring, resource mapping for mining purposes, disaster monitoring, coastal security and intelligence gathering.

The proposed invention facilitates autonomous control by providing a system consisting of UAVs and Low Earth Orbit (LEO) Earth Observation Satellites which communicates with these unmanned aerial devices through the use of at least one data relay satellite in Geostationary Equatorial Orbit (GEO), to image, process and output image data. The proposed system performs the above mentioned mapping or reconnaissance operations in a more efficient and cost effective manner, compared to conventional systems. The proposed system serves as an improvement to manual tasking and control of mapping operations using UAVs or satellites, which are currently not coordinated, and limited by ground station location or availability.

According to one aspect of the present invention there is provided a system for autonomously mapping and tracking ground targets at any location of interest involving unmanned aerial vehicles (UAV) and/or SAR satellites in low earth orbits with on board sensors for acquiring imagery data for the ground targets and a user control center (108) for executing a plurality of operations for controlling the UAVs and SAR satellites and processing various sensory inputs to optimally map or track the ground targets, the system comprises: at least one user control center in operative communication with one or more data relay satellites in Geostationary Equatorial Orbit (GEO), the data relay satellites in Geostationary Equatorial Orbit (GEO) in operative communication with the UAVs and/or SAR satellites to obtain various types of imagery data for the ground targets and simultaneously dynamically reconfiguring flight path and the on-board sensors pointing requirements to facilitate the optimal mapping and tracking of the ground targets; and the data relay satellites in GEO establishing target specific constant communication based on the user control center and it requires the UAVs and SAR satellites for continuous feedback and control through the UAVs and SAR satellites for the ground target mapping or tracking irrespective of their distances from the User control center.

The system for autonomously mapping or tracking ground targets at any location of interest comprises: one or more unmanned aerial vehicles (UAV) with on-board imaging sensors, position and time determination module and communication terminals for data transfer; one or more low earth orbit (LEO) satellites with on-board synthetic aperture radar sensors position and time determination module and communication terminals for data transfer; one or more geostationary earth orbit (GEO) satellites with data relay capabilities; user control center having communicating device for establishing communication with the GEO satellites thereby communication with the LEO satellites and the UAVs by involving data relay capabilities of the GEO satellites and data storage hardware and server platform for processing and storing sensory data; and the user control center having communication device for establishing communication with the data relay capabilities of the GEO satellites and data storage hardware and server platform for processing and storing sensory data.

According to another aspect of the present system, the on-board imaging sensors of the UAV comprise one or more hyper spectral, thermal infrared or Light Detection and Ranging (LIDAR) sensors.

According to a further aspect of the present system, the position and time determination module associated with the UAVs and the SAR satellites comprises GPS or Galileo satellite network receiver for determining in flight position of the UAVs and the SAR satellites by interfacing with GPS and/or Galileo Constellation. The communication terminals for data transfer associated with the UAVs and the SAR satellites comprises Ka-Band, X-Band or laser optical link establishing communication with the GEO satellites for transferring data to and from the UAVs and the SAR satellites.

According to yet another aspect of the present system, the GEO satellites are adapted to set communication link with the user control center via X-Band, Ku-Band or Ka-Band frequencies and the same is relayed to the UAVs and the SAR satellites via the Ka-Band, X-Band or laser optical link between the GEO satellites and the UAVs and SAR satellites.

According to a further aspect of the present system, the user control center further comprises of X-band, Ku-Band or Ka-Band antenna and transceiver for communicating with the GEO satellites. The user control center is also adapted to execute a plurality of operations for configuring and calculating flight path of the UAVs and the SAR satellites by comparing the GPS coordinates of each of the UAVs or SAR satellites controlled under the system with ground track coordinates provided by the user and synchronizes the timing and position information received along with the GPS coordinates for the each UAV with the timing and position of the satellite.

According to yet another aspect of the present system, the user control centre comprises Proportional Integral Derivative (PID) controller for deriving the UAV position and velocity information from the GPS coordinates to determine rough course and altitude adjustments as well as flight stabilization parameters for adjusting UAVs position and calculating its flight path. The user control center aligns the flight path of each UAV with each other UAVs associated with the system by involving ranging algorithms and the ranging algorithm involves three dimensional positional coordinate for a UAV with respect to the other UAVs in the formation and the range limits between these UAVs set in accordance with the user instruction prior to each mapping activity.

According to another aspect of the present system, the user control center (108) is adapted to dynamically reconfigure and recalculate the flight path for each time a GPS coordinate is received.

In accordance to another aspect of the present system the user control is further adapted to determine the pointing requirements of each UAV by adjusting yaw, pitch and roll angles by taking into account the UAVs velocity, altitude, flight angle as well as sensor parameters such as swath width, ground sampling distance, pixel size and jitter threshold. In addition, the user control center calculates the SAR satellite roll, pitch and yaw angles in formation with the UAVs based on its position, orbital velocity, altitude and sensor parameters such as swath width, ground sampling distance, pixel size and jitter threshold. The user control center also dynamically recalculates pointing of the UAVs and the SAR satellites for each time a GPS coordinate is received.

According to a further aspect of the present system, the user control center translates the calculated flight path and pointing requirements into suitable flight and pointing commands to interface with the UAV or SAR satellite on-board avionics.

According to a further aspect of the present system, the user control center is adapted to process all the optical and radar imagery and sensory data obtained from the UAVs and the SAR satellites to produce precise high resolution map images. The user control center further comprises user interface for displaying the precise high resolution map images in real time.

Additional aspects, features and advantages of the invention will become apparent to those skilled in the art upon consideration of the following detailed description of preferred embodiments of the invention in conjunction with the drawings listed below.

BRIEF DESCRIPTION OF THE ACCOMPANYING FIGURES

The present invention will be fully understood from the detailed description given herein below and the accompanying drawings which are given by way of illustration only, and thus are not limitative of the present invention, wherein.

DETAILED DESCRIPTION

The detailed description set forth below in connection with the appended drawings is intended as a description of exemplary embodiments and is not intended to represent the only form in which the embodiments may be constructed and/or utilized. The description sets forth the functions and the sequence for constructing the exemplary embodiments. However, it is to be understood that the same or equivalent functions and sequences may be accomplished by different embodiments that are also intended to be encompassed within the scope of this disclosure.

The conventional monitoring systems involving aerial devices require ground operators to be continuously available to command and control the aerial devices. Moreover, the conventional monitoring systems require the ground stations to be within the aerial devices' communication antenna's line of sight to receive tasking commands or perform data downlink operations. Thus, the flight path and transmission of images or surveillance data by the aerial devices was restricted by the ground station location. This led the present invention to provide a system for autonomously mapping and tracking ground targets of interest.

In accordance with this invention, the system enables the aerial assets to be independent of the location of the ground stations for tracking a particular ground target and performing data downlink operations.

Figure 1:
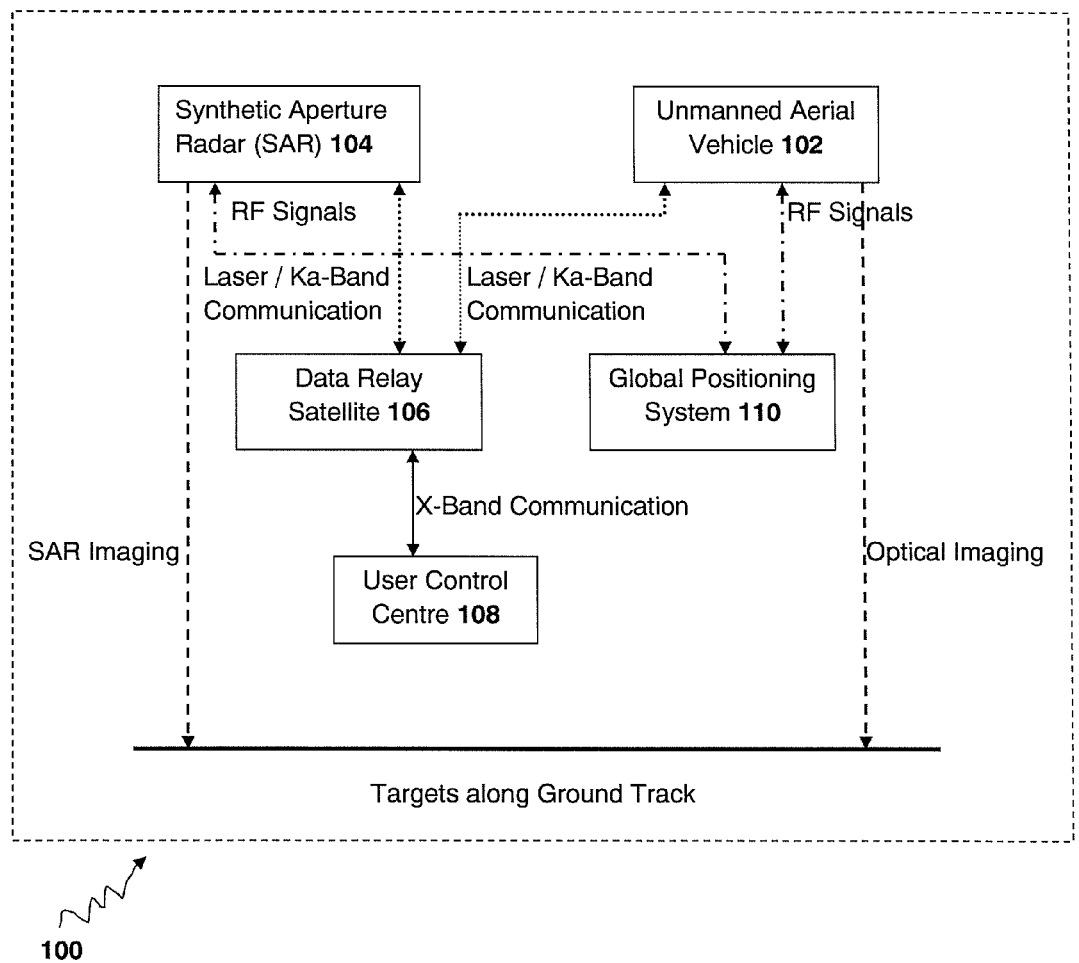
FIG. 1 illustrates a preferred embodiment of the control system for autonomously mapping and tracking ground targets at any location of interest involving essential physical elements of the system and their interaction in accordance with the present invention.

Reference is first invited from the accompanying FIG. 1, which illustrates the physical elements required by the present system (100) in order to perform its operational tasks such as autonomously mapping and tracking ground targets at any location of interest. As shown in the figure, the control system (100) comprises a User Control Centre (108) consisting of a console which executes a customized application of the present control system with screens to display the processed imagery from the mapped or tracked ground target. The user control center (108) also comprises data storage hardware and server platforms group adapted to facilitate storing and processing of the raw data. The control center (108) is equipped with X-Band, Ku-Band or Ka-Band antenna and transceiver in order to communicate with data relay satellites (106) in Geostationary Equatorial orbit (GEO).

One or more data relay satellites (106) in GEO are incorporated in the present system (100) for receiving and transmitting data from the user control center (108) to the unmanned aerospace assets (102, 104) used for mapping or tracking ground targets. The GEO satellites operate in X-Band, Ku-Band or Ka-Band with data relay capabilities in either laser, X-band or Ka-Band.

The unmanned aerospace assets (102,104) used in the present system (100) for mapping or tracking ground targets comprise one or more UAVs (102) with a plurality of on-board discrete imaging sensors and one or more satellites (104) in the low earth orbit (LEO) equipped with Synthetic Aperture Radar (SAR). The present system (100) utilizes these unmanned aerospace assets (102, 104) i.e. the UAVs and the SAR satellites in combined formation flying maneuvers and point the UAVs and the SAR satellites with the on-board sensors to obtain various types of raw imagery data for the ground targets at the location of interest to optimally map or track the ground targets specified by the user control center (108). The SAR satellites (104) provide the user control center (108) with a wider vision of the ground target and the UAVs (102) provide the user control center (108) with a narrow and focused view of the same ground target. This feature enables the user control center (108) to receive high resolution and multidimensional images from the aerial and space assets (102, 104) which are the UAVs and the SAR satellites.

The UAVs (102) are equipped with hyperspectral, thermal infrared or Light Detection and Ranging (LIDAR) sensors. Each of the UAVs (102) and the SAR satellites (104) under the system (100) are equipped with a position and time determination module such as GPS receiver or Galileo satellite network receiver for determining in flight position of the UAVs and the SAR satellites by interfacing with GPS and/or Galileo Constellation. The UAVs and the SAR satellites also comprise laser, X-Band or Ka-Band enabled communication terminals for establishing communication link with the GEO satellites. The communication link of the UAVs and the SAR satellites with the GEO satellites facilitate transferring of the sensory data to the user control center (108) through the GEO satellites and transferring of command instruction from the user control center (108) to the UAVs and the SAR satellites through the GEO satellites.

The number of data relay GEO satellites, UAVs and SAR satellites used for a particular mapping scenario depends on the existing physical infrastructure available to the user. The user has the flexibility to be able to increase frequency of coverage, and establish new coverage locations around the world, by expanding the physical system to include more UAVs or satellites, as needed, at locations of interest. The software control system will be periodically updated to allow for additional interfaces as the number of UAVs and satellites under its control increases.

Figure 2:
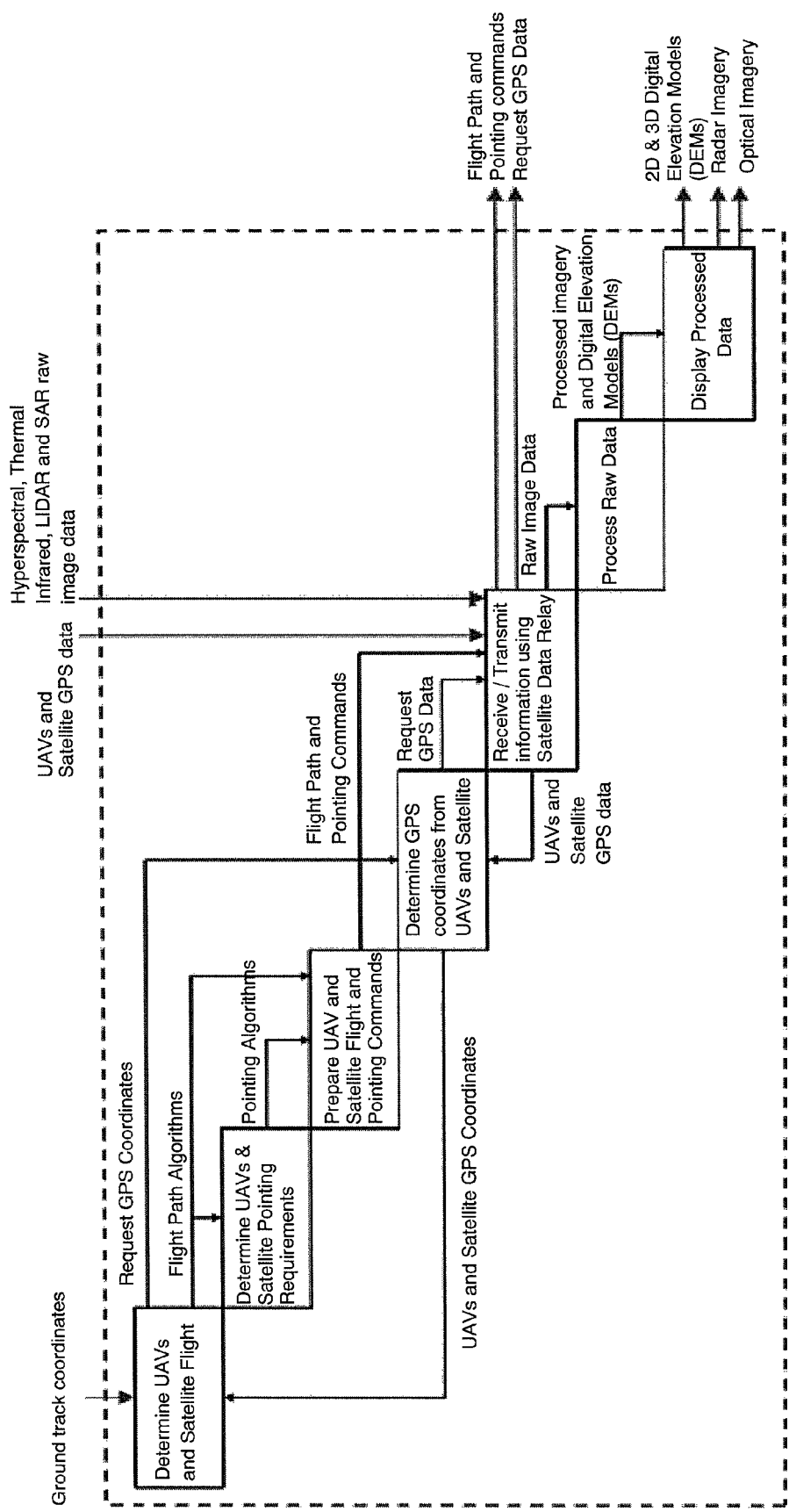
FIG. 2 shows the functional architecture of the control system and the interaction between the functional elements in the functional architecture in accordance with the present invention.

Reference is next invited from the accompanying FIG. 2 which shows the functional architecture of the user control center (108). The user control center (108) incorporates an application which includes functional elements for facilitating ground target mapping and tracking. FIG. 2 shows the functional elements (shown in rectangular boxes with continuous line) of the user control center (108) which interface autonomously but concurrently command and control the UAVs and SAR satellites in low earth orbit, receive and transmit all data via data relay satellites (106) as well as process and display image data. The details of these functional elements are provided hereunder:

Function Element 1: Determine UAVs and Satellite Flight Path

This function element receives input ground track coordinates from the user (for instance in the form of latitude and longitude) and compares it with the GPS coordinates of each UAV or SAR satellite controlled under this system. In this function element, flight path of the UAVs and the SAR satellites is configured and calculated by comparing the GPS coordinates of each of the UAVs or SAR satellites controlled under the system with ground track coordinates provided by the user and synchronizing the timing and position information received along with the GPS coordinates for the each UAV with the timing and position of the satellite. The present function element also comprise a Proportional Integral Derivative controller for deriving the UAV position and velocity information from the GPS coordinates to determine rough course and altitude adjustments as well as flight stabilization parameters for adjusting UAVs position and calculating its flight path.

Subsequently, the function uses ranging algorithms to align the flight path of each UAV with each other. The ranging algorithms consist of 3-dimensional coordinate positioning for a UAV with respect to the other UAVs in the formation. The range limits between these UAVs would be set by the user prior to each mapping activity. In order to formation fly the UAVs with one or more SAR satellites, the timing and position information received along with the GPS coordinates for each UAV will be synchronized with the timing and position of the satellite.

The function element accomplishes this by receiving the GPS position and timing information of the satellite and also uses the orbital speed and flight path angle of the satellite to pace the speed and orientation of the UAVs relative to the satellite. The timing range kept between satellite and UAV would be pre-determined by the user based on satellite altitude and orbit constraints, prior to the mapping activity.

As a result, flight path algorithms are produced for each UAV and SAR satellite, which are communicated to Function Elements 2 and 3. The flight path algorithms are reiterated and re-communicated each time a GPS coordinate is received.

Function Element 2: Determine UAVs and Satellite Pointing Requirements

Using the flight path algorithms provided by Function Element 1, this function element determines the pointing requirements of each UAV and satellite in the formation. For each UAV, corresponding yaw, pitch and roll angles are determined by taking into account the UAVs velocity, altitude, flight angle as well as sensor parameters such as swath width, ground sampling distance, pixel size and jitter threshold.

Similarly, the satellite roll, pitch and yaw angles are calculated based on satellite position, orbital velocity, altitude and sensor parameters such as swath width, ground sampling distance, pixel size and jitter threshold.

This function will output pointing algorithms for each UAV and satellite to Function Element 3. The pointing algorithms are reiterated and re-communicated every time flight path algorithms are received.

Function Element 3: Prepare UAV and Satellite Flight and Pointing Commands

Upon receipt of UAV or satellite flight and pointing algorithms from Function Elements 1 and 2, this function element translates the algorithm code into suitable flight path and pointing commands to interface with UAV or satellite on-board avionics.

The UAV flight path and pointing commands is processed by the UAV on-board avionics to actuate and control the flight control surfaces and engine speed accordingly.

The satellite flight path and pointing commands is uploaded to the on-board satellite avionics, to control its attitude and orbit control hardware, such as momentum wheels and propulsion systems.

Function Element 4: Determine GPS Coordinates from UAVs and Satellite

This function element interfaces with Function Element 1 and Function Element 5 to receive, process and transfer GPS data obtained from each UAV or satellite during operations.

Once the present system is initiated by the User with the provision of ground coordinates, this function element is triggered to retrieve GPS data from the operational unmanned assets, using Function Element 5 and provide the data in the form of time and coordinates to Function Element 1 for flight path algorithm code generation.

Function Element 5: Receive/Transmit Information Using Satellite Data Relay

The purpose of this function element is to manage the transmission and receipt of all data between the software control system and UAVs and satellites, through the use of data relay satellites in GEO.

Function Element 5 will activate and control the X-band, Ku-Band or Ka-Band transceiver and antenna at the user control center (108) to communicate with the data relay satellite. The data relay satellite will be tasked with transmitting flight path and pointing commands to the UAVs and SAR satellites. In addition, this function element will retrieve GPS data as well as raw image data from the UAVs and SAR satellites, using the data relay satellites.

Any raw image data received by this function element will be transferred to Function Element 6 for processing. Similarly, GPS data received is transferred to Function Element 4.

Function Element 6: Process Raw Data

Function Element 6 processes the raw imagery data obtained from Function Element 5 into full, high resolution optical and radar imagery, as well as produces 2D and 3D Digital Elevation Models (DEMs). This function element will be able to process imagery obtained from hyperspectral wavelengths, thermal infrared wavelengths, Light Detection and Ranging (LIDAR) wavelengths, as well as Synthetic Aperture Radar (SAR).

This function element will interface with existing, commercially available, processing software to produce precise high resolution map images and DEMs. It will access hard drives or servers in the user control center (108) to provide either temporary or permanent data storage during data processing. All processed images and DEMs will be transferred to Function Element 7 in order to be displayed to the User.

Function Element 7: Display Processed Data

Function Element 7 arranges the processed optical and radar imagery as well as the DEMs according to user display preferences and displays the images to screens in the user control center (108). It also provides the option to distribute these high resolution images to select mobile handheld devices via encrypted broadband services offered by the data relay satellites in GEO.

Operational Scenario Example

Figure 3:
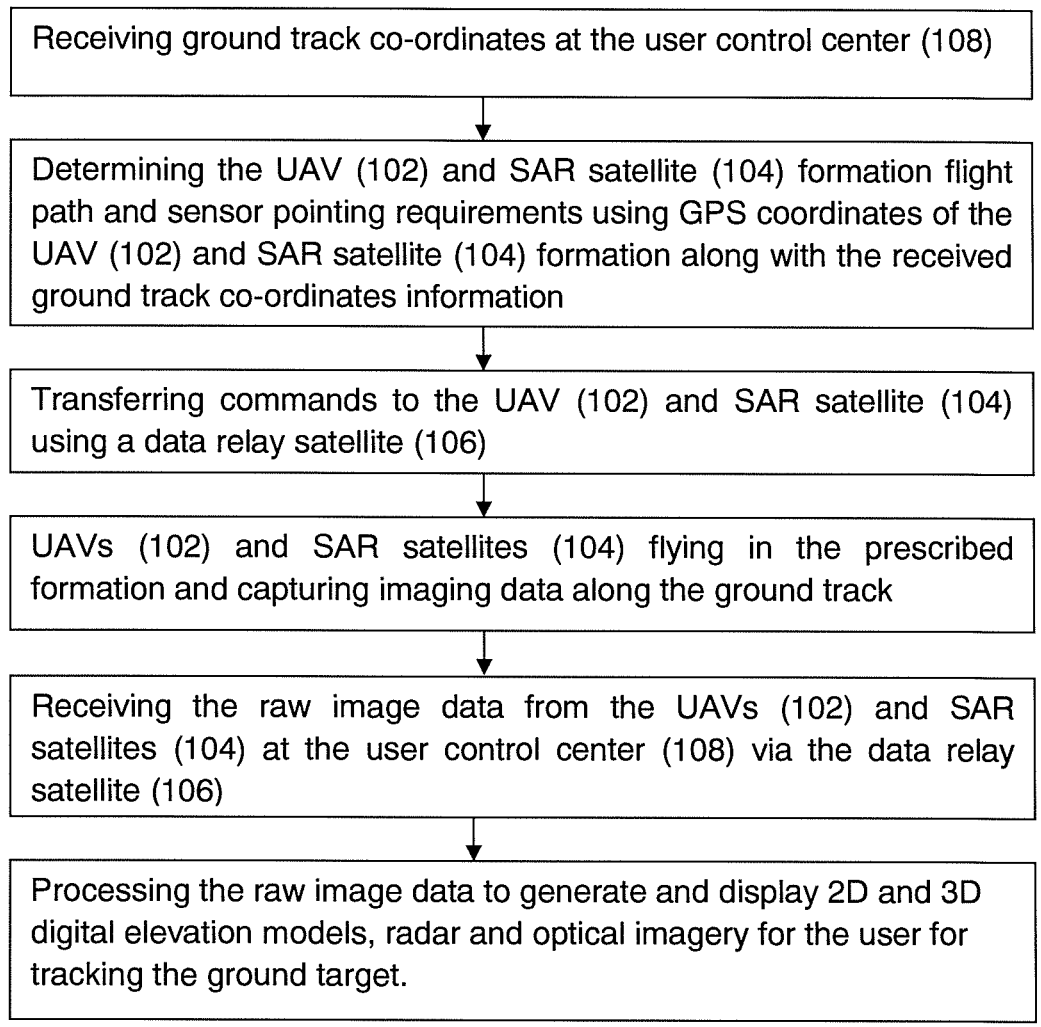
FIG. 3 shows a typical operational scenario for tracking ground targets by involving the present control system in accordance with the present invention.

Reference is invited from the accompanying FIG. 3 which shows a typical operational scenario for tracking ground targets by involving the present control system. As shown in the figure, firstly, the user provides coordinates of the ground track which spans the entire region of interest in a suitable coordinate frame for the system to read. The system processes the ground coordinates along with the GPS coordinates from UAVs and SAR satellites in the LEO. All communication between the software control system and these unmanned aerospace assets takes place via data relay satellites in GEO.

The system uses its in-built algorithms to determine a suitable formation flight path for the combined group of UAVs and SAR satellites. Based on that flight path, the sensor pointing angles required by each UAV and satellite in the formation is also determined. There will be continuous feedback and control between the user control center (108) and the unmanned assets during the entire mapping or tacking period and the system continuously manages flight path and pointing control by tracking the GPS coordinates of the unmanned assets and comparing it to the prescribed ground coordinates.

As the mapping of the ground track is performed, the raw image data obtained from UAVs and SAR satellites is processed at the server at the user control center (108) to produce 2D and 3D Digital Elevation Maps (DEMs), radar imagery and optical imagery. These images are then displayed to the user in near real-time. The image data processing time may vary based on the operating hardware specifications of the console.

Therefore enabling resource mapping or ground target identification activities by the cooperative use of UAVs, SAR satellites in LEO and data relay satellites in GEO achieves the capability to autonomously command and control these unmanned assets with minimal human interaction during operations. Utilizing UAVs and SAR satellites in combined formation flying maneuvers to obtain various types of imagery data for a particular location of interest and at the same time dynamically reconfigure flight path and on-board sensor pointing requirements facilitates to optimally map or track the ground targets specified by the User. Also the involvement of the data relay satellites in GEO to establish an indirect constant communication between the User control centre, at any location around the world and the UAVs and SAR satellites allows the user to operate the UAVs and SAR satellites for ground target mapping or tracking irrespective of their distances from the User control centre.

The invention claimed is:

1. A system for mapping and tracking ground targets of interest, comprising;
   at least one unmanned aerial vehicle, UAV and at least one Synthetic-Aperture Radar, SAR satellite in Low Earth Orbit, LEO, wherein each of the UAVs and the SAR satellites include on board sensors for acquiring imagery data for the ground target;
   at least one data relay satellite in Geostationary Equatorial Orbit, GEO in operative communication with the UAVs and the SAR satellites capable of obtaining a plurality of imagery data for the ground targets and capable of sending flight path co-ordinates and the on-board sensors' pointing requirements to the UAVs and the SAR satellites; and
   at least one user control center in operative communication with said data relay satellite for transmitting commands for controlling the UAVs and the SAR satellites and processing a plurality of sensory inputs received from the UAVs and the SAR satellites to map and track the ground targets,
   wherein said data relay satellite establishes a ground target specific communication with a user control center and its associated UAVs and SAR satellites for continuous feedback and control of the UAVs and SAR satellites for the ground target mapping and tracking irrespective of their distances from the user control center.

2. The system as claimed in claim 1, wherein the at least one UAV and the at least one SAR include a position and time determination module; and a communication module, wherein said position and time determination module having a GPS or Galileo satellite network receiver for determining in flight position of the UAVs and the SAR satellites by interfacing with one or more of a Global Positioning System, GPS, and Galileo Constellation; and said communication module for data transfer.

3. The system as claimed in claim 1, wherein said user control center comprises:
   a communicating device for establishing communication with the data relay satellite for communicating with the SAR satellites and the UAVs by involving data relay capabilities of said data relay satellite;
   at least one data storage hardware and server for processing and storing sensory data; and
   an antenna and transceiver for communicating with said data relay satellite, wherein said antenna is at least one of a X-band, a Ku-Band and a Ka-Band antenna.

4. The system as claimed in claim 1, wherein the on-board imaging sensors of the UAV are selected from the group consisting of hyperspectral sensors, thermal infrared sensors and Light Detection and Ranging (LIDAR) sensors.

5. The system as claimed in claim 1, wherein the communication modules for data transfer associated with the UAVs and the SAR satellites communicate with said data relay satellite for uplink operation and downlink operation using communication links selected from the group consisting of Ka-Band, X-Band and laser optical links.

6. The system as claimed in claim 1, wherein said data relay satellite communicates with the user control center using communication links selected from the group consisting of X-Band links, Ku-Band links and Ka-Band frequency links.

7. The system as claimed in claim 1, wherein said user control center executes at least one functional element for configuring and calculating flight path of the UAVs and the SAR satellites by comparing the GPS coordinates of each of the UAVs or SAR satellites controlled under the system with ground track coordinates provided by the user and synchronizing the timing and position information received along with the GPS coordinates for the each UAV with the timing and position of the satellite.

8. The system as claimed in claim 7, wherein said user control center comprises Proportional Integral Derivative controller for deriving the UAV position and velocity information from the GPS coordinates to determine rough course and altitude adjustments as well as flight stabilization parameters for adjusting UAVs position and calculating its flight path.

9. The system as claimed in the claim 7, wherein the functional element executed by said user control center is adapted to align the flight path of each UAV with each other UAVs associated with the system using ranging techniques.

10. The system as claimed in claim 9, wherein the ranging techniques involve using a 3-Dimensional positional coordinate for a UAV with respect to the other UAVs in the formation and the range limits between these UAVs set in accordance with the user instruction prior to each mapping activity.

11. The system as claimed in the claim 7, wherein the functional element executed by the said user control center is adapted to dynamically reconfigure and recalculate the flight path for the UAVs and the SAR satellites each time a GPS coordinate is received.

12. The system as claimed in claim 1, wherein said user control center is further adapted to execute a functional element for determining the pointing requirements of each UAV by adjusting yaw, pitch and roll angles by taking into account the UAVs velocity, altitude, flight angle and sensor parameters.

13. The system as claimed in the claim 12, wherein the functional element executed by said user control center is adapted to calculate the SAR satellite roll, pitch and yaw angles in formation with the UAVs based on its position, orbital velocity, altitude and sensor parameters.

14. The system as claimed in the claim 13, wherein the functional element executed by said user control center is adapted to dynamically recalculate pointing of the UAVs and the SAR satellites for each time a GPS coordinate is received.

15. The system as claimed in claim 1, wherein said user control center is adapted to execute a functional element for translating the calculated flight path and pointing requirements into suitable flight and pointing commands to interface with the UAV or SAR satellite on-board avionics.

16. The system as claimed in claim 1, wherein said user control center is adapted to process all the optical and radar imagery and sensory data obtained from the UAVs and the SAR satellites to produce precise 2D and 3D Digital Elevation Models (DEMs) and high resolution images.

17. The system as claimed in claim 1, wherein said user control center comprises a user interface for displaying the precise 2D and 3D Digital Elevation Models (DEMs) and high resolution images in real time.

18. The system as claimed in claim 1, wherein said user control center includes means to distribute the high resolution images to designated mobile handheld devices via encrypted broadband services offered by the data relay satellites in GEO.

19. A machine-readable storage device incorporated in the user control center as claimed in claim 1, said machine-readable storage device comprising a non-transitory computer program product having functional elements operable to cause the user control center to perform operations comprising:

receiving ground co-ordinates of a ground target of interest from a user;

controlling the user control center's transceiver and antenna to communicate with at least one data relay satellite for transmitting commands for controlling a plurality of UAVs and a plurality of SAR satellites to map and track ground targets;

configuring and calculating a flight path of the UAVs and the SAR satellites based on the received ground co-ordinates and the GPS coordinates of the UAVs and the SAR satellites;

determining the pointing requirements of each UAV and SAR satellite;

translating the calculated flight path and pointing requirements into suitable flight and pointing commands to interface with the UAV's or SAR satellite's on-board avionics;

recalculating pointing of the UAVs and the SAR satellites each time a GPS coordinate of the UAVs and the SAR satellites is received at the user control center;

processing various optical and radar imagery and sensory data obtained from the UAVs and the SAR satellites for a ground target to produce precise high resolution map images; and displaying the precise high resolution map images in real time on one or more of a user interface of the user control center and designated mobile handheld devices.

\* \* \* \* \*